(12) United States Patent
Quesenberry et al.

(10) Patent No.: US 10,290,052 B1
(45) Date of Patent: May 14, 2019

(54) ATM EXCEPTION PROCESSING SYSTEM AND METHOD

(75) Inventors: David Anthony Quesenberry, Lewis Center, OH (US); Warren Gavin Lewis, Chandler, AZ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 761 days.

(21) Appl. No.: 12/869,865

(22) Filed: Aug. 27, 2010

Related U.S. Application Data

(60) Provisional application No. 61/237,934, filed on Aug. 28, 2009.

(51) Int. Cl.
*G06Q 40/00* (2012.01)

(52) U.S. Cl.
CPC .................... *G06Q 40/00* (2013.01)

(58) Field of Classification Search
CPC ...... G06Q 40/02; G06Q 20/40; G06Q 20/108; G06Q 20/3221; G06Q 20/4014; G06Q 40/00; G06Q 20/10; G06Q 20/102; G06Q 30/02; G06Q 30/04; G06Q 30/06
USPC .......................................................... 705/43
See application file for complete search history.

(56) References Cited

U.S. PATENT DOCUMENTS

| | | | |
|---|---|---|---|
| 5,842,040 A | 11/1998 | Hughes et al. | |
| 6,003,677 A | 12/1999 | Foley | |
| 7,461,773 B2 | 12/2008 | Updike et al. | |
| 7,617,152 B2 | 11/2009 | Chai et al. | |
| 8,078,518 B2 * | 12/2011 | Goertz | G06Q 20/1085 705/35 |
| 8,271,386 B2 | 9/2012 | Seay et al. | |
| 8,321,346 B2 * | 11/2012 | Celi, Jr. | G06Q 20/1085 705/40 |

(Continued)

FOREIGN PATENT DOCUMENTS

| | | |
|---|---|---|
| EP | 0851701 | 7/1998 |
| WO | WO2001084436 | 11/2001 |

OTHER PUBLICATIONS

"At Your Service", A Newsletter from the Federal Reserve Bank of Kansas City, Special Ed., Summer 1995. Kansas City.*

(Continued)

*Primary Examiner* — Hani M Kazimi
(74) *Attorney, Agent, or Firm* — Greenblum & Bernstein, P.L.C.

(57) ABSTRACT

A computer-implemented ATM exception processing method and system are provided for facilitating completion of ATM deposit transactions upon occurrence of an exception. The method comprises implementing one or more computer processors for performing steps including: detecting the occurrence of an exception in response to a transaction involving a deposited check at an ATM monitoring system and transmitting transaction information associated with the exception transaction from the ATM monitoring system to a transaction reconstruction system. The method may additionally include transmitting a transaction record of the transaction to a customer claim system, reconstructing the transaction at the reconstruction transaction system, exchanging information between the customer claim system and the transaction reconstruction system, and completing exception processing based on the exchanged information.

8 Claims, 8 Drawing Sheets

(56) References Cited

U.S. PATENT DOCUMENTS

| | | |
|---|---|---|
| 8,340,979 B2 | 12/2012 | Zou |
| 8,429,079 B1 | 4/2013 | Cameo |
| 2004/0133516 A1* | 7/2004 | Buchanan ............ G06Q 20/042 |
| | | 705/42 |
| 2006/0129484 A1* | 6/2006 | Hurwitz ............... G06Q 20/102 |
| | | 705/40 |
| 2006/0289630 A1* | 12/2006 | Updike .................. G06Q 20/04 |
| | | 235/379 |
| 2007/0181668 A1* | 8/2007 | Kwak ................... G06Q 20/042 |
| | | 235/379 |
| 2008/0098393 A1 | 4/2008 | Chai et al. |
| 2010/0250418 A1* | 9/2010 | Schrick ................. G06Q 40/00 |
| | | 705/35 |

OTHER PUBLICATIONS

IBM 3898 Image Processor, Product Announcement, IBM, US Marketing & Services, Mar. 13, 1990.*

* cited by examiner

ATM EXCEPTION PROCESSING SYSTEM AND METHOD

RELATED APPLICATIONS

This application is related to and claims priority from U.S. Provisional Application Ser. No. 61/237,934, filed on Aug. 28, 2009, which is hereby fully incorporated by reference.

TECHNICAL FIELD

Embodiments of the invention are related generally to systems and methods for exception processing and in particular to exception processing in connection with Automatic Teller Machines (ATMs).

BACKGROUND OF THE INVENTION

ATMs enable customers to carry out a variety of banking transactions by interacting with the machine rather than with a human teller. Examples of banking transactions that are commonly carried out using ATMs include withdrawals, deposits, transfer of funds between accounts, payment of bills, or account balance inquiries.

ATMs have evolved to include scanning capabilities such that ATM deposits can occur without an envelope or a deposit slip. Recognition and verification are conducted on deposited checks. The ATM includes or connects with functionality that enables identification of the customer through the ATM card and recognition of the deposited check using scanning equipment and associated software. If recognition and verification are successful, the check is forwarded to additional centralized processes.

However, a variety of error conditions can occur, which can prevent successful recognition and verification. One difficulty with ATMs is the inability to efficiently and promptly correct errors that might occur when recognition and verification are unsuccessful. For example, one commonly occurring error includes a scanning or paper jam error. When such an error occurs, a check inserted for scanning may or may not be properly read. Furthermore, whether or not the check has been properly imaged, if the check becomes jammed, an exception condition will likely be detected and the transaction will not be completed.

Currently, if such an error occurs, only a manual based exception processing system that requires human intervention is available. An individual is required to physically go to machine, remove items associated with the error, and take them to another site for processing.

Upon occurrence of such an exception condition, customers will frequently contact the financial institution and register a claim in order to ensure proper processing of the deposit. While the financial institution may immediately register the claim, corrective processing typically does not occur for many days after the customer has deposited in the check. In fact, systems typically require that an agent manually clean the exception items from the ATM in order to properly credit deposits subject to error conditions.

Thus, a solution is needed that will more expeditiously handle processing of exception items with minimal or no human intervention. Changes to ATM processing can be incorporated to create a mechanism for processing ATM exception items. Furthermore, a solution is needed that will minimize the need for customer claim processing by addressing exception items upon the initial occurrence.

SUMMARY OF PREFERRED EMBODIMENTS

Embodiments of the present invention are directed to an ATM exception processing system and method that expedite completion of transactions when an exception occurs.

In one aspect of the invention, a computer-implemented ATM exception processing method is provided for facilitating completion of ATM deposit transactions upon occurrence of an exception. The method comprises implementing one or more computer processors for performing steps including detecting, at an ATM monitoring system, the occurrence of an exception in response to a transaction involving a deposited check and transmitting transaction information associated with the exception transaction from the ATM monitoring system to a transaction reconstruction system. The method additionally includes transmitting a transaction record of the transaction to a customer claims system and reconstructing the transaction at the transaction reconstruction system. The method further includes exchanging information between the customer claim system and the transaction reconstruction system and completing exception processing based on the exchanged information.

In a further aspect of the invention, a computer-implemented ATM exception processing system is provided for facilitating completion of ATM deposit transactions upon occurrence of an exception. The system comprises an ATM exception monitoring computing system including an error detection engine for detecting exception conditions, an image handler for retrieving images captured during transactions generating exception conditions, and a reporting engine for reporting transaction information and exception conditions. The exception processing system may additionally include a deposit assembly and reconstruction transaction computing system receiving the captured images associated with the exception transactions from the ATM exception monitoring system and implementing a transaction assembler to collect transaction information and reconstruct the exception transactions. The system may additionally include a customer claims processing computing system for receiving transaction information from the ATM exception monitoring system and communicating with the deposit assembly and reconstruction transaction system, wherein the deposit assembly and reconstruction transaction system completes exception processing based on the transaction information received from the customer claims processing system and the ATM exception monitoring system.

In yet a further aspect of the invention, a computer-implemented ATM exception processing method for facilitating completion of ATM deposit transactions upon occurrence of an exception is provided. The method comprises detecting the occurrence of an exception through an ATM exception monitoring computing system in response to a transaction involving a deposited check and automatically transmitting transaction information related to the deposited check to a transaction reconstruction computing system. The method may further include transmitting a transaction record of the transaction from the ATM monitoring computing system to a customer claims system and reconstructing the transaction at the transaction reconstruction computing system. The method may further include exchanging information between the customer claims system and the transaction reconstruction computing system and completing exception processing based on the exchanged information.

DESCRIPTION OF DRAWINGS

Embodiments of the present invention are directed to a system and method for handling exception items at an ATM and in particular to handling exception items related to deposits. The system includes a mechanism to electronically harvest all of the transaction activity from the ATM to automate the exception handling process, thereby expediting collection of the checks and ensuring that customers get their credit even if the ATM registered an exception item. The system thus assembles deposits and reconstructs transactions. The system includes the further capability to extract data and process rejected transactions electronically. A novel ATM interface may pass all of the transaction activity from the ATM to a centralized unit, regardless of whether the activity was good (no exceptions) or bad (exceptions) activity.

Figure 1:
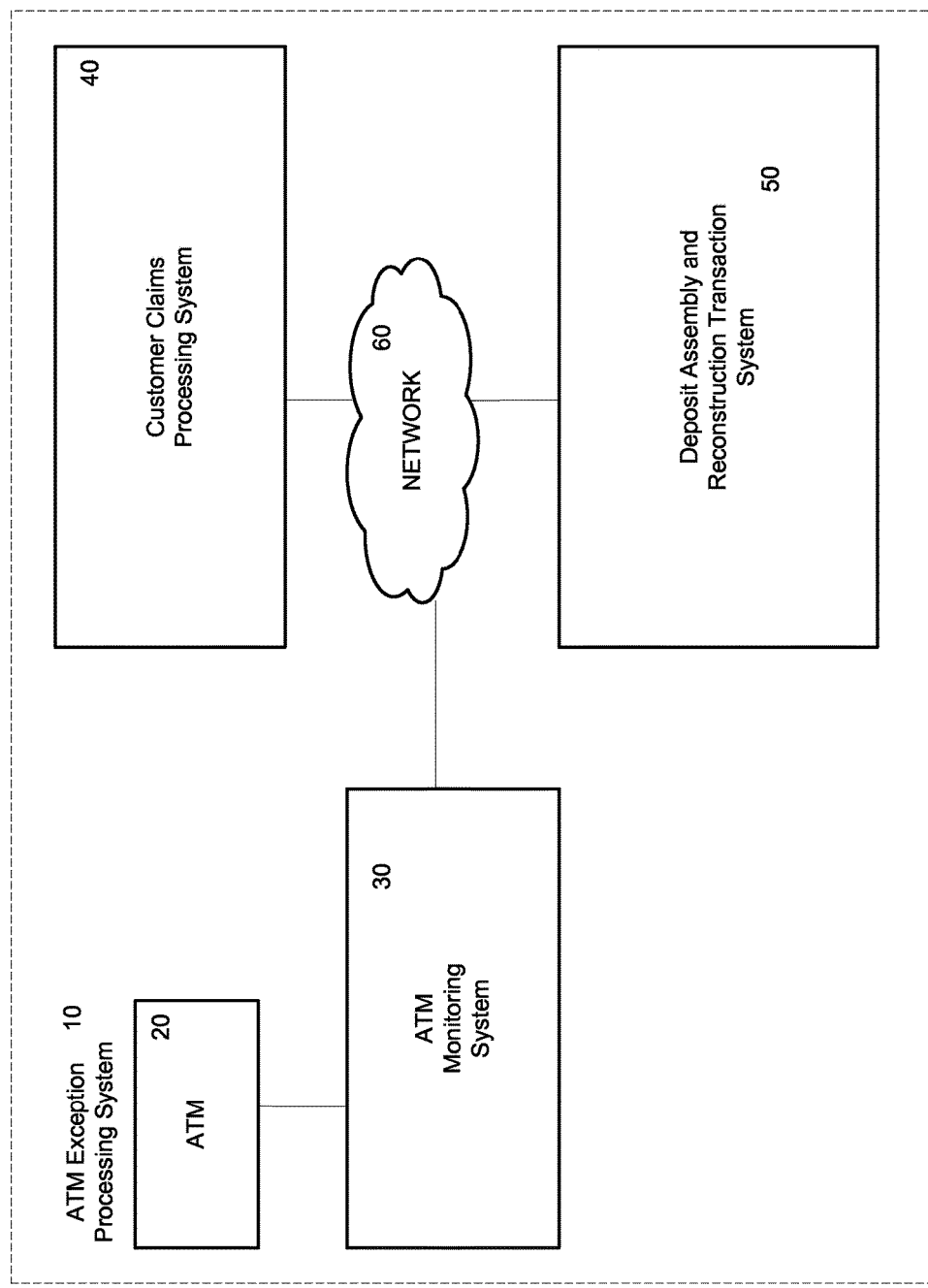
FIG. 1 is a block diagram illustrating an operating environment for an ATM exception processing system in accordance with an embodiment of the invention.

FIG. 1 is a block diagram illustrating an operating environment for an ATM exception processing system 10 in accordance with an embodiment of the invention. The ATM exception processing system 10 may include an ATM 20, and ATM monitoring system 30, a customer claims processing system 40, and a deposit assembly and reconstruction system 50. The aforementioned components may be connected over a network 60.

The ATM 20 is known in the art to be a computerized telecommunications device that provides the clients of a financial institution with access to financial transactions without the need for a cashier, human clerk or bank teller. On most modern ATMs, the customer is identified by inserting a plastic ATM card with a magnetic stripe or a plastic smart card with a chip, that contains a unique card number and some security information such as an expiration date and CVV code. Authentication is typically provided by the customer entering a personal identification number (PIN). However, other authentication techniques may be implemented. Using an ATM, customers can access their bank accounts in order to make deposits of cash or checks, make cash withdrawals, obtain credit card cash advances, and check their account balances as well as other functions. In the context of the disclosed system, the ATM preferably has scanning capabilities, such that no envelopes are necessary and the ATM 20 is able to capture an image of the deposited check.

The ATM 20 may include various hardware components, including for example, a CPU to control the user interface and transaction devices, a card reader to identify the customer, PIN Pad, secure crypto-processor, display; a data entry mechanism, and a record printer to provide the customer with a transaction record. An ATM vault may house a dispensing mechanism to provide cash or other items of value and a deposit mechanism including a check processing module and bulk note acceptor. The ATM may also include security sensors, locks, and other features.

The ATM monitoring system 30, customer claims processing system 40, and deposit assembly and reconstruction system 50 are described in greater detail below with respect to FIGS. 2-4. These systems are shown as separate and distinct, but may, in embodiments of the invention, be integrated into various combinations. The systems operate cooperatively to process data received from ATM 20 in order to facilitate completion of exception transactions. Exception transactions may occur, for example, when a check becomes jammed, diverted, or retracted in the ATM 20. Other exception conditions are also within the scope of the invention.

The network 60 is preferably the Internet, but may be or include other types of networks. The network 30 may include a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

All of the aforementioned components may be interconnected in order to work cooperatively. Furthermore, the components may comprise software, hardware, and a combination of software and hardware. Use of the various components in a computing environment is discussed below with reference to FIG. 5.

Figure 2:
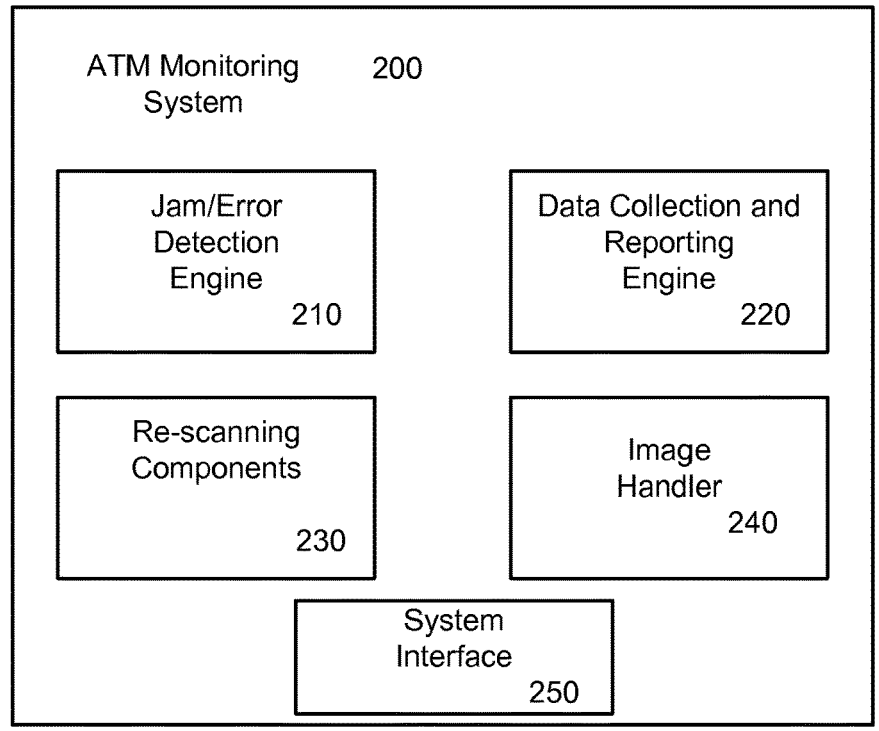
FIG. 2 is a block diagram illustrating components of an ATM monitoring system in accordance with an alternative embodiment of the invention.

FIG. 2 is a block diagram illustrating components of an ATM monitoring computing system 200 in accordance with an alternative embodiment of the invention. The ATM monitoring computing system 200 may include a jam or error detection engine 210, a data collection and reporting engine 220, re-scanning components 230, image handler 240, and system interface 250. In embodiments of the invention, the monitoring system 200 may be integrated with the ATM 20. Alternatively, the monitoring system 200 may be connected over a network with the ATM 20.

While existing ATM systems simply fail to forward information associated with exceptions, the ATM monitoring computing system 200 will forward all known information, even related to exception items to external systems, which will process the transactions flagged as exceptions and attempt to convert them into valid transactions. These actions are possible in part because items are flagged as exceptions for various reasons. Sometimes an image may rejected because the deposited check became jammed in the ATM even if the depositor and amount of deposit were already known. The system registers the depositor and the amount and verifies the image data to determine whether enough data is available to complete the transaction. Even in instances in which completion of the transaction is not feasible, the system records the available information and maintains a record of the ATM transaction.

The jam or error detection engine 210 initially detects the exception, which most often will occur due to a jam, but may also occur for other reasons related to mechanical failure or due to the deposit materials themselves.

The data collection and reporting engine 220 may report the error and the collected transaction data to external systems. For example, the reporting engine 220 will report a transaction amount, cardholder identity, date, and time, if available to external systems or may alternatively implement an internal database to store transaction data for future use.

Re-scanning components 230 may be implemented if the error caused a failure of image capture. Typically, the re-scanning components are actuated by a technician after detection of the error.

Image handler 240 may locate the image, which may include either the original image, a re-scanned image, or both images if available, and transmit the images for processing. Thus, when an exception occurs at the ATM 20, the system determines whether an image is available. This determination may be made through software and hardware components that may be stored inside the ATM 20. The components typically include Character amount recognition (CARR) and legal amount recognition (LARR). These components help to determine if manual intervention will be required or whether the exception can be resolved through the reconstruction transaction system.

System interface 250 may allow communication between the monitoring system and the external systems described herein, such as the customer claims processing system and the reconstruction transaction system.

Figure 3:
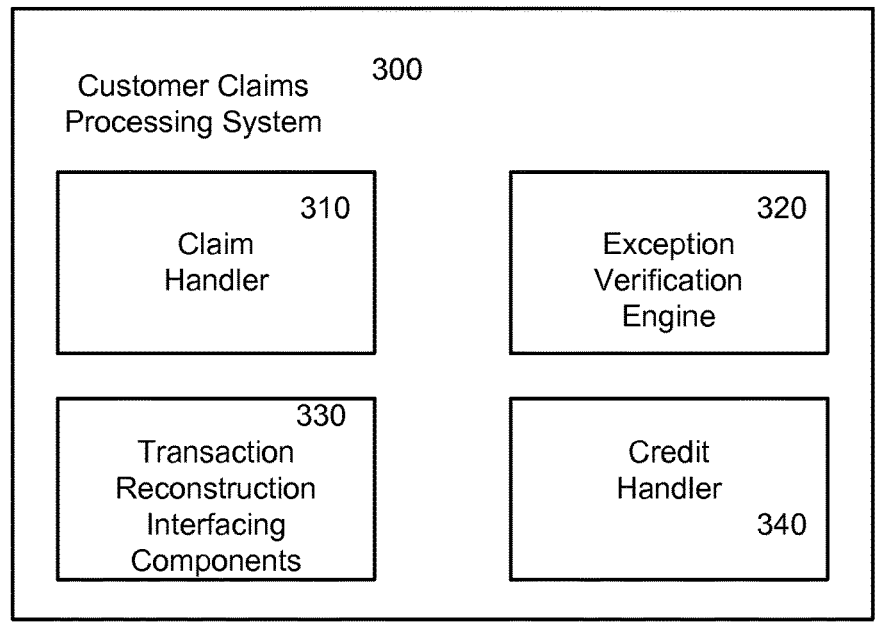
FIG. 3 is a block diagram illustrating components of a customer claims processing system in accordance with an embodiment of the invention.

FIG. 3 is a block diagram illustrating components of a customer claims processing computing system 300 in accordance with an embodiment of the invention. The claims processing computing system 300 may includes a claim handler 310, an exception verification engine 320, transaction reconstruction interfacing components 330, and credit handler 340. The claim handler 310 may accept and process customer claims related to the occurrence of exception items during ATM transaction. Exception verification engine 320 may verify, based for example on the card number received, that an exception occurred. Transaction reconstruction interfacing components 330 serve to share information with the reconstruction transaction system in order to verify assembly of the transaction. The credit handler 310 may determine if a credit should be assessed and issue the credit appropriately.

Figure 4:
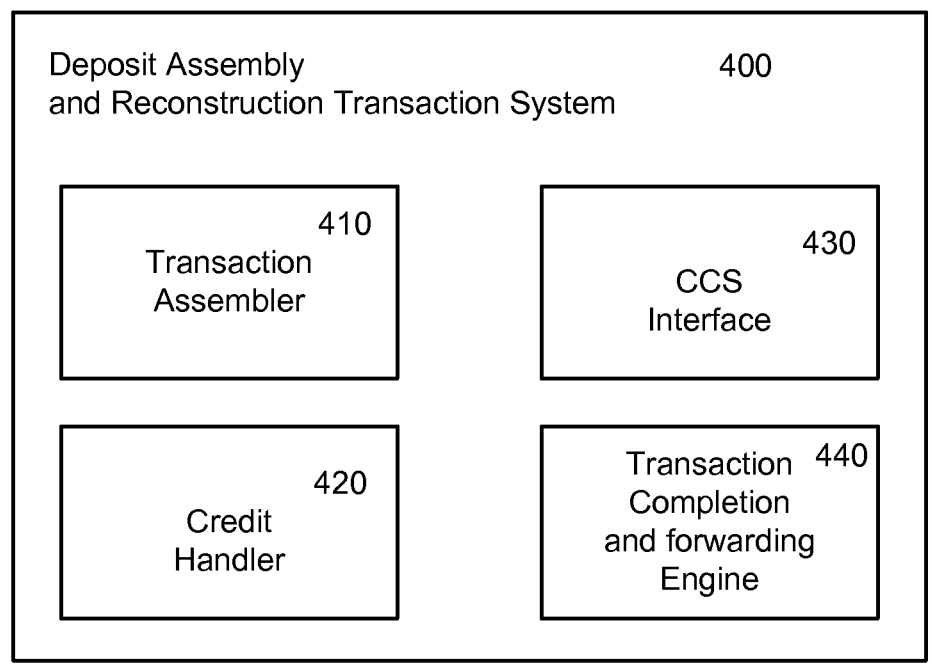
FIG. 4 is block diagram illustrating components of a deposit assembly and reconstruction transaction system in accordance with an embodiment of the invention.

FIG. 4 is block diagram illustrating components of a deposit assembly and reconstruction transaction computing system 400 (also referred to as "reconstruction transaction system") in accordance with an embodiment of the invention. The reconstruction transaction system 400 may include a transaction assembler 410, a credit handler 420, CCS interface 430, and transaction completion and forwarding engine 440.

The transaction assembler 410 include functionality for assembling an exception transaction without the complete information that generally accompanies a transaction. Functionality may include an HTTP web service landing zone, to which re-scanned images and XML may be directed. The system may further include a work flow parser including parser service, data perfection service, and persister service.

A completion aggregator may be connected with a match service for performing matching operations. A construction aggregator may post constructed data. A data perfection system may provide remediation services and data validation services to the work flow parser. A reconstruction transaction website may include functionality such as a viewer, an assembler, an assembly manager, a claim matcher, and a free form. Reconstruction transaction web services may include inbound service and outbound services. Other functionality that may be provided includes issues service, ICS, GEN2, EOD, and reporting services.

The credit handler 420 determines whether a provisional credit should be assessed. The system may determine whether a matching claim is present. A claim would be present, for example, if a customer had immediately filed a claim upon experiencing an unsuccessful ATM transaction. When an exception occurs, some customers quickly make a claim. These customers have already caused an active claim to be present prior to operation of the reconstruction transaction system. The reconstruction transaction system determines if there is such a claim available. If there is a claim available, then the customer already has credit and the system assigns a provisional credit to offset the credit that the system has already applied for them. If there was no credit available, the reconstruction transaction system sends the transaction onto posting and updates the claim system. When the customer does call in, the system has already resolved the exception and there is no need to open a claim.

The CCS interface 430 shares information regarding claims and completed transactions between systems and the transaction completion and forwarding engine 440 may forward the completed transactions to other applicable systems.

All of the components shown in FIGS. 1 through 4 above may be, include, or be implemented by a computer or multiple computers. The components may be described in the general context of computer-executable instructions, such as program modules, being executed by a computer. Generally, program modules include routines, programs, objects, components, data structures, etc. that perform particular tasks or implement particular abstract data types.

Figure 5:
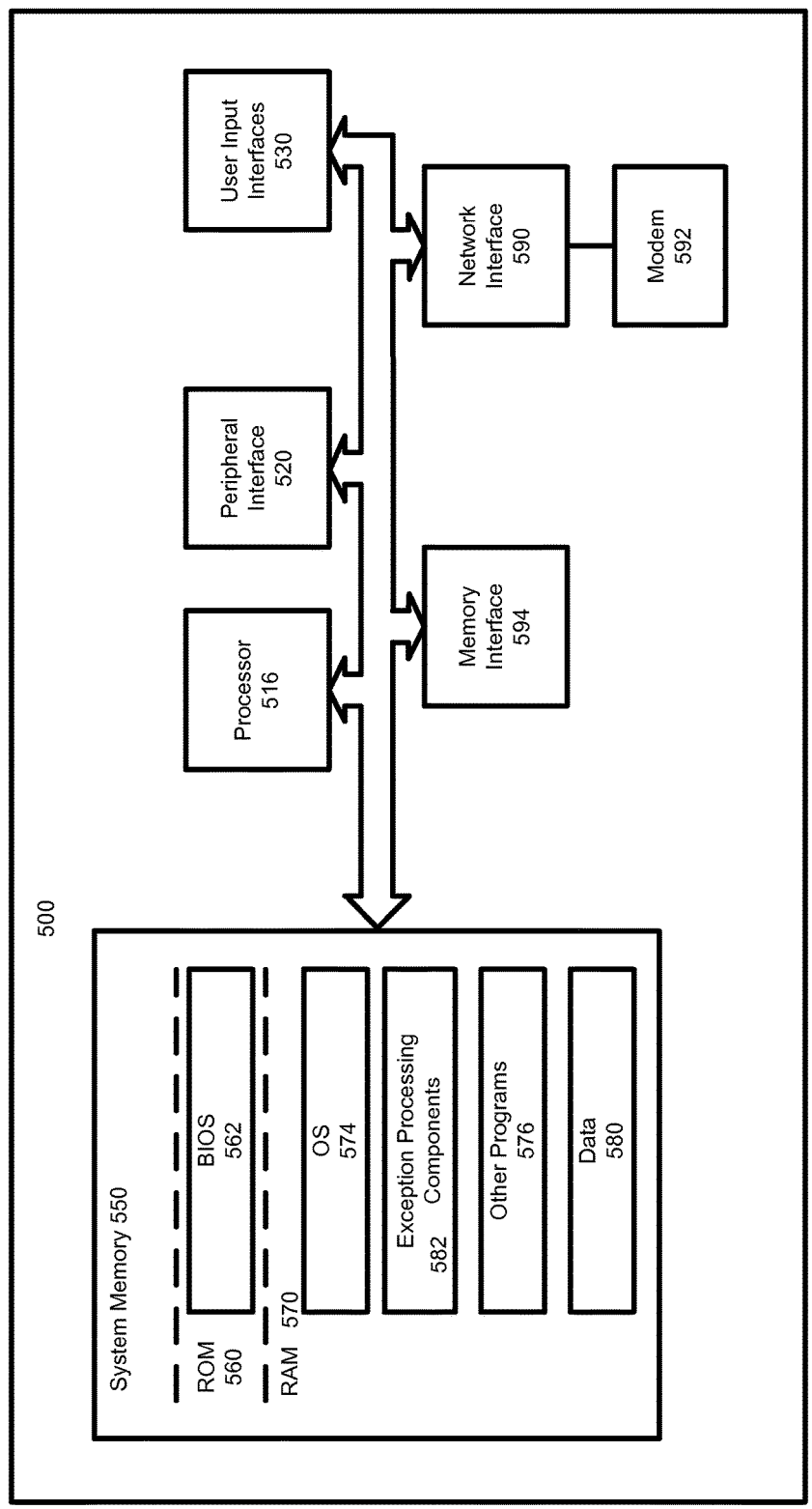
FIG. 5 illustrates an exemplary computing environment in accordance with an embodiment of the invention.

FIG. 5 is a block diagram illustrating a computing system 500 implementing exception processing system applications that may be utilized in accordance with an embodiment of the invention. This configuration is merely exemplary and should not be construed as limiting. It is likely that multiple computing systems or devices will be utilized to implement the method and system in accordance with embodiments of the invention. The computing system 500 may include a processing unit 510, a peripheral interface 520, a user input interface 530, a system bus 540, a system memory 550, a network interface 590, a connected modem, transceiver, adaptor, or other communication device 592, and a memory interface 594. The system bus 540 may be provided for coupling the various system components.

Computers typically include a variety of computer readable media that can form part of the system memory and be read by the processing unit. By way of example, and not limitation, computer readable media may comprise computer storage media and communication media. The system memory 550 may include computer storage media in the form of volatile and/or nonvolatile memory such as read only memory (ROM) 560 and random access memory (RAM) 570.

A basic input/output system (BIOS) 562, containing the basic routines that help to transfer information between elements, such as during start-up, is typically stored in ROM 560. RAM 570 typically contains data and/or program modules that are immediately accessible to and/or presently being operated on by processing unit. The data or program modules may include an operating system 574, remote response system components 510, other program modules 576, and program data 580. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system of platform.

At a minimum, the memory 550 includes at least one set of instructions that is either permanently or temporarily stored. The processor 510 executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The exception processing components 582 may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer. Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. In embodiments of the invention, Ab Initio™ software is implemented and structured query language (SQL) is implemented for coding.

Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface.

The processing unit 510 that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

A user may enter commands and information into the computer through a user interface 530 that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface 520. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention. These networks may include any of those described above with reference to FIG. 1. Although many other internal components of the computer are not shown, those of ordinary skill in the art will appreciate that such components and the interconnections are well known. Accordingly, additional details concerning the internal construction of the computer need not be disclosed in connection with the present invention.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

Although the aforementioned components are shown as discrete modules, each of the modules may alternatively be integrated with one another. If the modules are discrete, multiple modules may operate cooperatively as will be further explained below.

Figure 6:
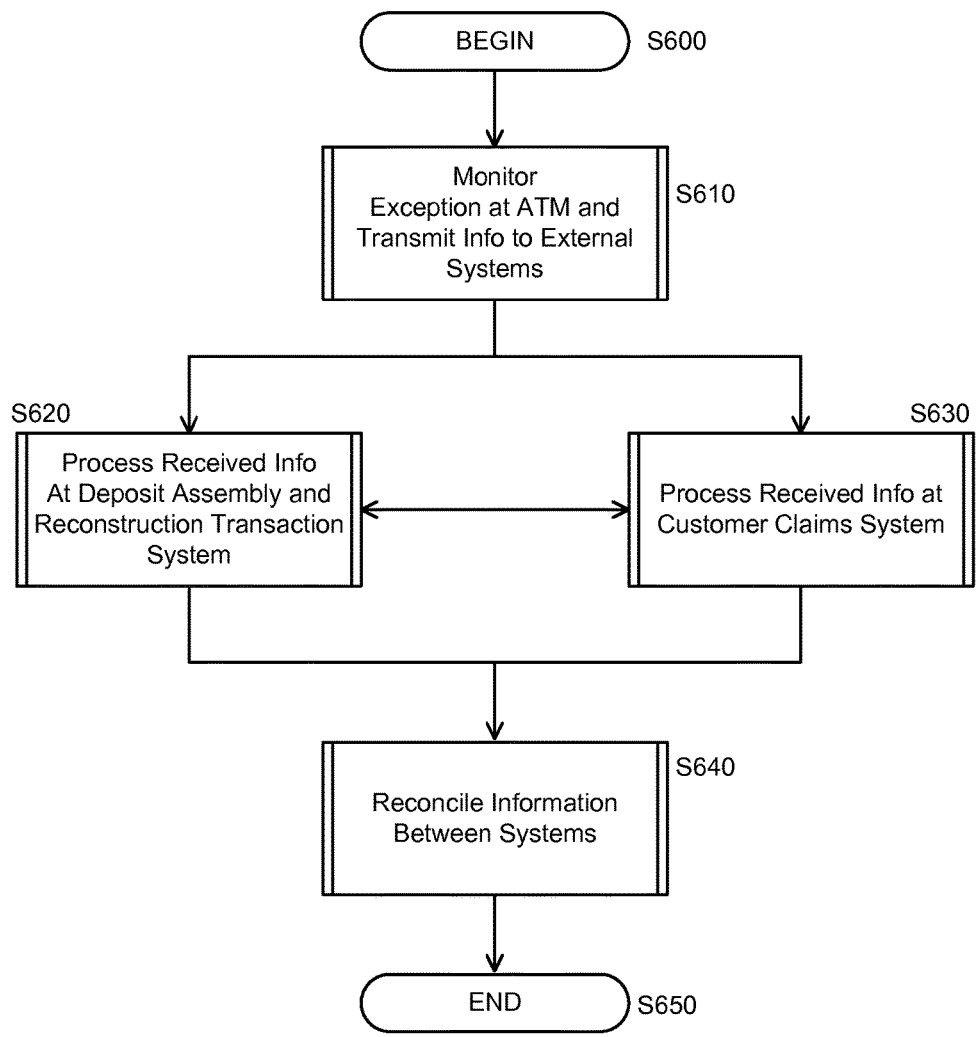
FIG. 6 is a flow chart illustrating an exception processing method in accordance with an embodiment of the invention.

FIG. 6 is a flow chart illustrating an exception processing method in accordance with an embodiment of the invention. The method begins in S600 and the monitoring system monitors exceptions at the ATM and collects transaction data and reports the transaction data to external systems. In S620 and S630, the external systems receive, process, and share information as will be further described with respect to the flowcharts below. In S640, the information between systems is reconciled and exception processing is completed.

Figure 7:
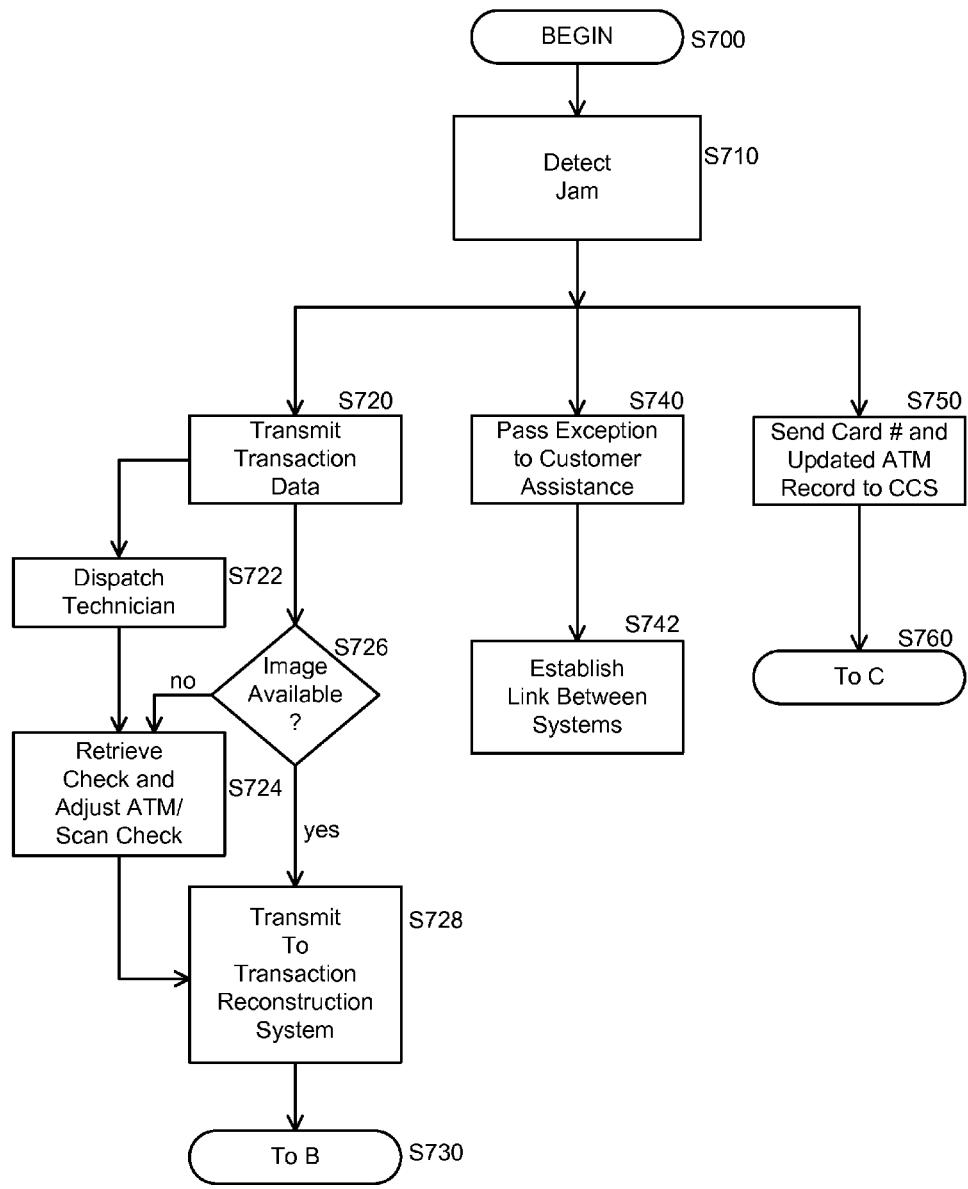
FIG. 7 is a flow chart illustrating operations of the exception monitoring computing system in accordance with an embodiment of the invention.

FIG. 7 is a flow chart illustrating operations of the exception monitoring computing system in accordance with an embodiment of the invention. The method begins in S700 and the system detects a jam or other error at the ATM in S710. In steps S720, S740, and S750, the system collects information regarding the transaction and forwards the collected information for the exception transaction to external systems. Thus, in a first phase, after collecting the exception data, the system attempts to convert exception transactions to completed transactions. If conversion is not feasible, in a second phase, the system warehouses the data for later processing.

Specifically, in S720, available transaction data is transmitted. In S730, a technician is dispatched to ensure proper operation of the ATM for future transactions and to enable collection of additional data for those transactions that could not be completed. Thus, the second phase of operation may be facilitated by manual intervention. When the technician goes to the ATM to manage the clearing process, the technician may remove the divert bin housing the exception items and hand feed the exception items back into the ATM system for re-scanning. In the process of the re-scan, the ATM communicates to the deposit assembly and reconstruction of transactions system. As will be further described below, the reconstruction transaction system weeds out transactions that were already resolved and matches data against bad transactions that could not be resolved so that the re-scans can be implemented to resolve the unresolved transactions.

If an image is available in S726, the image is transmitted to the reconstruction transaction system in S728. If no image is present in S726, the image is obtained through re-scanning by the technician in S724 and the re-scanned image is transmitted to the reconstruction transaction system in S728. The method passes to process B performed by the transaction reconstruction system in S728.

In S740, captured information may be passed to customer assistance and a link may be established between systems in S742. In S750, the card number and ATM record may be passed to CCS, where process C takes over in S760.

Figure 8:
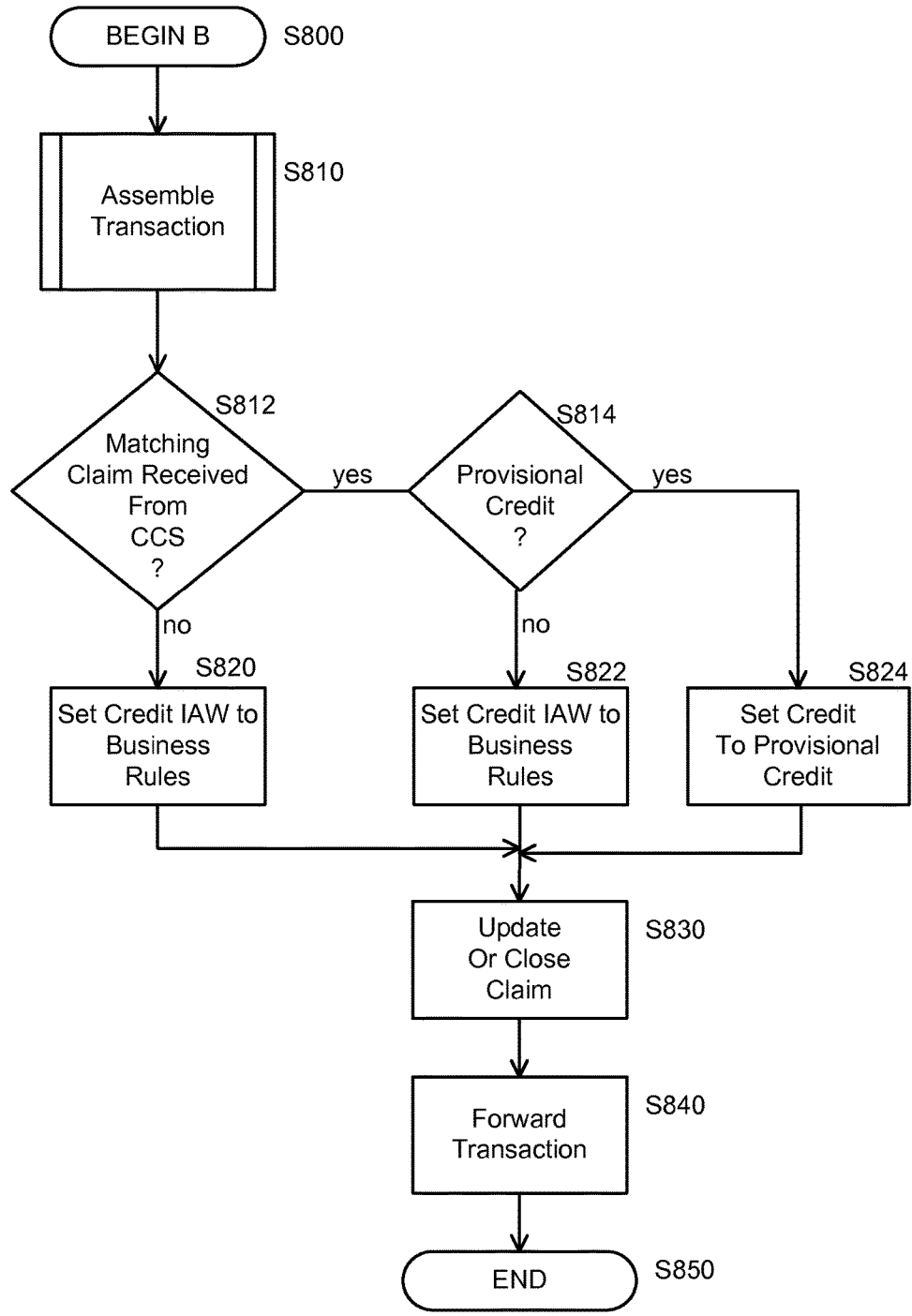
FIG. 8 is a flow chart illustrating operations of the deposit assembly and reconstruction transaction computing system in accordance with an embodiment of the invention.

FIG. 8 is a flow chart illustrating operations of the deposit assembly and reconstruction transaction computing system in accordance with an embodiment of the invention. The method begins in S800 and the transaction is assembled in S810. S810 may be a process including numerous steps.

In S812, the reconstruction transaction system determines if a matching claim was received from CCS. If no matching claim has been received in S812, the systems sets credit in accordance with business rules in S820. However, if a matching claim has been received in S812, the system determines whether a credit has been assessed. If a provisional credit is assessed, the system sets credit to provisional in S824. If no provisional credit is assessed in S814, the system sets the credit in accordance with business rules in S822. After credit handling, the system updates or closes the claim in S830 and forwards the transaction in S840. The process ends in S850.

Thus, upon receiving the assembled transaction data from the monitoring system, the reconstruction transaction system may determine whether a matching claim is present. A claim would be present, for example, if a customer had immediately filed a claim upon experiencing an unsuccessful ATM transaction. When an exception occurs, some customers quickly make a claim. These customers have already caused an active claim to be present prior to operation of the reconstruction transaction system. The reconstruction transaction system determines if there is such a claim available. If there is a claim available, then the customer already has credit and the system assigns a provisional credit to offset the credit that the system has already applied for them. If there was no credit available, the reconstruction transaction system sends the transaction onto posting and updates the claim system. When the customer does call in, the system has already resolved the exception and there is no need to open a claim.

Much of the efficiency resulting from implementation of the invention occurs through the interaction between the monitoring system and the transaction reconstruction system prior to the dispatch of the technician.

When the reconstruction transaction system completes validation of the exception transactions to convert them to completed transactions, the resolution time is greatly improved from that of prior existing systems, enabling the transactions to be completed days sooner than previously possible. In existing systems, no resolution is typically reached until a customer claim is filed and the operator is sent to ATM. This process can normally consume up to ten days. In this newly proposed system, a good portion of the items will be cleared on the same day and the maximum number of days required for resolution is greatly reduced and typically may require a maximum of three to four days.

Figure 9:
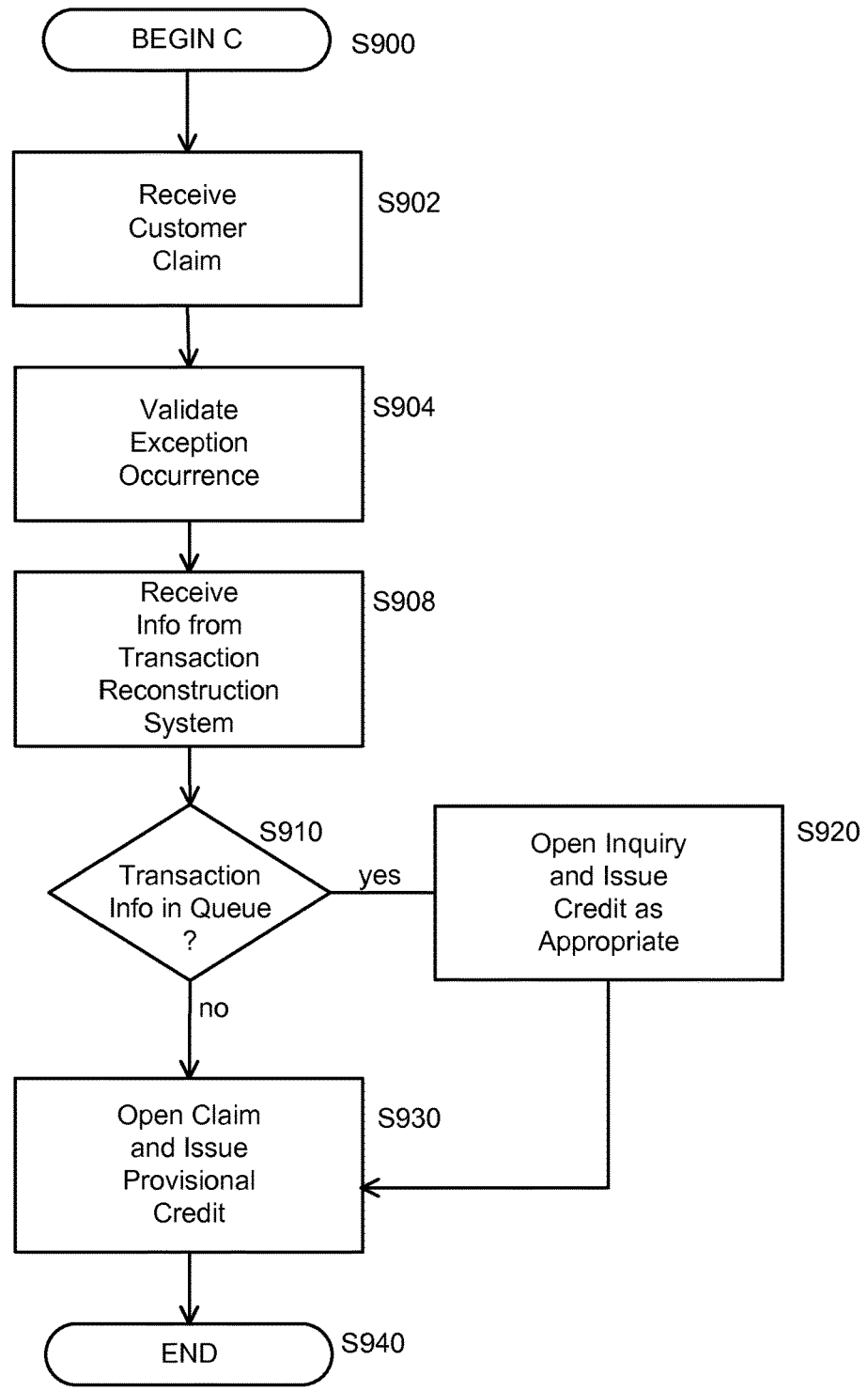
FIG. 9 is a flow chart illustrating a method for processing transaction information at a customer claims system in accordance with an embodiment of the invention.

FIG. 9 is a flow chart illustrating a method for processing information at a customer claims system in accordance with an embodiment of the invention. Process C begins in S900. A customer claim is received in S902. In S904, the customer claims system validates the exception occurrence. In S908, the customer claims system receives information from the reconstruction transaction system and in S910, the customer claims system determines if transaction information is in queue. If no information is in the queue, the system opens a claim and issues a provisional credit in S930. If the transaction information is in the queue, the customer claims system opens an inquiry and issues a credit as appropriate in S920. The process ends in S940.

The network provides the reconstruction transaction system with the ability to communicate with the customer claim system. The customer claims system asks the reconstruction transaction system if it contains exceptions and if it does, the customer claims system retrieves the images from the reconstruction transaction system. Additionally, the reconstruction transaction system may request from the customer claims system information regarding any open claims. If the customer claims system contains any open claims, the reconstruction transaction system may resolve and close those claims.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations.

What is claimed is:

1. A computer-implemented ATM exception processing method for facilitating completion of ATM deposit transactions upon occurrence of an exception, the method comprising:
   detecting, using an error detection engine of an ATM monitoring computing system, the occurrence of an exception in response to a transaction involving a deposited check at an ATM, wherein the exception includes a hardware error;
   automatically reporting, over a network, from the ATM monitoring computing system, the exception to a reconstruction transaction system and a customer claim system;
   transmitting transaction information including a transaction amount and cardholder identity associated with the exception transaction from the ATM monitoring system to the reconstruction transaction system;
   determining at the ATM monitoring computing system whether a scanned image is available for the transaction generating the exception;
   transmitting the scanned image from the ATM monitoring computing system to the reconstruction transaction system when the scanned image is available after detection of an exception, the reconstruction transaction system assembling the transaction based on the scanned image and the transmitted transaction information;
   transmitting a transaction record of the transaction from the ATM monitoring computing system to the customer claim system;
   automatically, responsive to the reporting of the exception, dispatching manual intervention to address the hardware error, after transmitting the exception transaction information and the transaction record, upon detecting the exception;
   responsive to the dispatch, re-scanning the deposited check when no scanned image is available and transmitting the re-scanned image to the reconstruction transaction system, the reconstruction transaction system including a transaction assembler having a web service landing zone receiving re-scanned images;
   reconstructing the transaction at the reconstruction transaction system by matching the exception transaction information with transaction information associated with the re-scanned check or the scanned image;
   determining, at a credit handler of the reconstruction transaction system, if the customer claim system recorded a claim matching the reconstructed transaction;
   exchanging information that includes at least the matched information between the customer claim system and the reconstruction transaction system;
   determining whether to assign a provisional credit for the transaction generating the exception at the credit handler of reconstruction transaction system;
   completing exception processing based on the exchanged matched information to convert the exception to a completed transaction.

2. The method of claim 1, wherein determining at the reconstruction transaction system whether to assign a provisional credit comprises assigning the provisional credit if the matching customer claim is present in the customer claims system.

3. The method of claim 1, wherein exchanging information comprises providing information from the reconstruction transaction system to the customer claims system to verify that the exception transaction is assembled.

4. The method of claim 1, wherein completing exception processing comprises updating credits, closing any existing claim, and sending the transaction to a receiving application.

5. A computer-implemented ATM exception processing system for facilitating completion of ATM deposit transactions upon occurrence of an exception, the system comprising:
   an ATM exception monitoring computing system including at least one computer processor programmed to perform steps including:
      detecting, using an error detection engine of the ATM exception monitoring computing system, exception conditions in response to a transaction involving a deposited check at an ATM, wherein the exception includes a hardware error;
      retrieving images captured during transactions generating exception conditions,
      automatically reporting transaction information and exception transaction information including a transaction amount and cardholder identity and a transaction record over a network to additional systems within the ATM exception processing system,
      automatically, responsive to the reporting of the exception, dispatching manual intervention to address the hardware error, after transmitting the exception transaction information and the transaction record,
      determining whether a scanned image is available for the transaction generating the exception,
      and
   responsive to the dispatch, re-scanning the deposited check when no scanned image is available;
   a deposit assembly and reconstruction transaction computing system, the reconstruction transaction system assembling the transaction based on the scanned image and the transmitted transaction information and in communication over a network with a customer claims processing system and the ATM exception monitoring computing system for receiving the captured images associated with the exception transactions from the ATM exception monitoring system and programmed for;
      implementing a transaction assembler to collect the transaction information and reconstruct the exception transactions by matching the exception transaction information with transaction information associated with the re-scanned check or the existing scanned image, the transaction assembler having a web service landing zone receiving re-scanned images;
      determining, if the customer claim system recorded a claim matching the reconstructed transaction by matching the transaction information with transaction information associated with the re-scanned check or an existing scanned image, wherein the deposit assembly and reconstruction transaction computing system includes a credit handler for determining whether to assign provisional credit;

wherein the customer claims processing computing system in communication over a network with the ATM monitoring computing system is programmed for receiving information that includes at least the matched information from the ATM exception monitoring system and communicating with the deposit assembly and reconstruction transaction system, the customer claims processing computing system including a claim handler for receiving a customer claim related to the exception transaction, wherein the deposit assembly and reconstruction transaction computing system completes exception processing based on information received from the customer claims processing system and the ATM exception monitoring system to convert the exception to a completed transaction.

6. The system of claim 5, wherein the reconstruction transaction computing system comprises a customer claims system interface for exchanging information from the reconstruction transaction system to the customer claims system to verify that the exception transaction is assembled.

7. The system of claim 5, wherein the reconstruction transaction computing system comprises a transaction completion and forwarding engine for completing exception processing by updating credits, closing any existing claim, and sending the transaction to a receiving application.

8. The system of claim 5, wherein the credit handler assigns the provisional credit if the matching customer claim is present in the customer claims system.

\* \* \* \* \*